No. 738,798. PATENTED SEPT. 15, 1903.
J. & F. H. HAVILAND & J. FARMER.
APPLIANCE FOR ELEVATING AND DISCHARGING GRAIN OR THE LIKE.
APPLICATION FILED JULY 15, 1902.
NO MODEL. 3 SHEETS—SHEET 2.
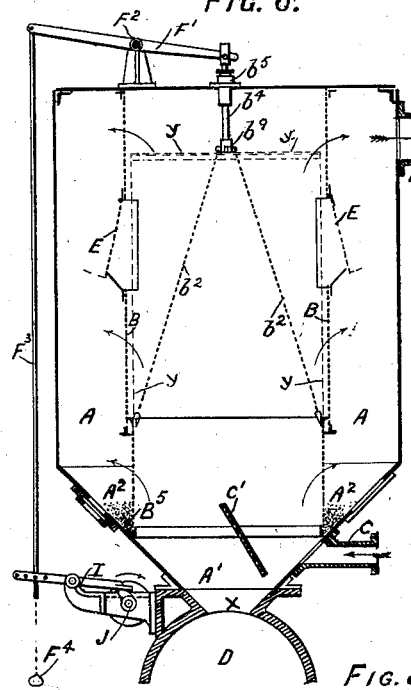
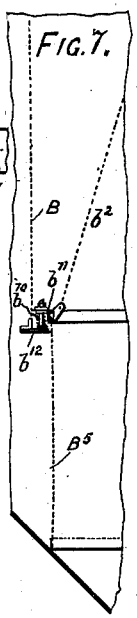
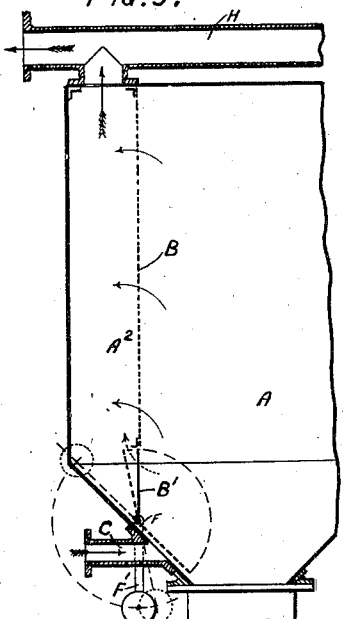
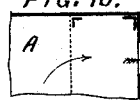
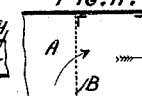
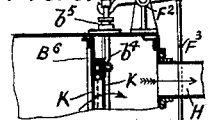
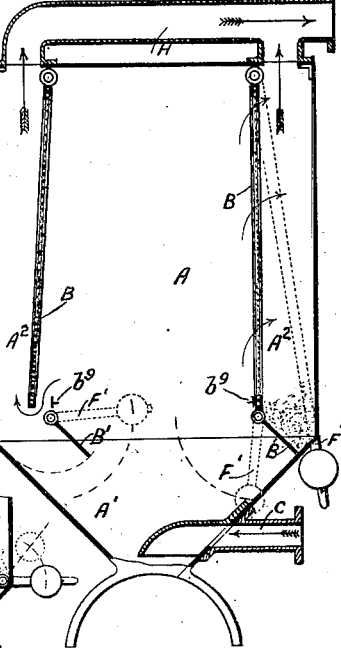
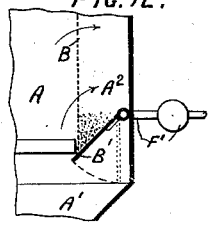
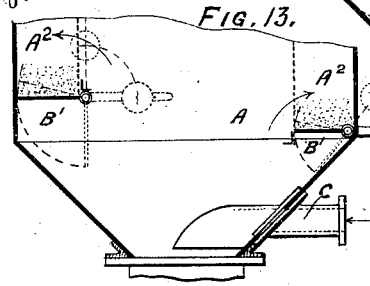
WITNESSES
F. W. Wright
Walter Abbs
INVENTORS
JOHN HAVILAND
FREDERICK HENRY HAVILAND
JOHN FARMER
BY Howson & Howson
THEIR ATTORNEYS.

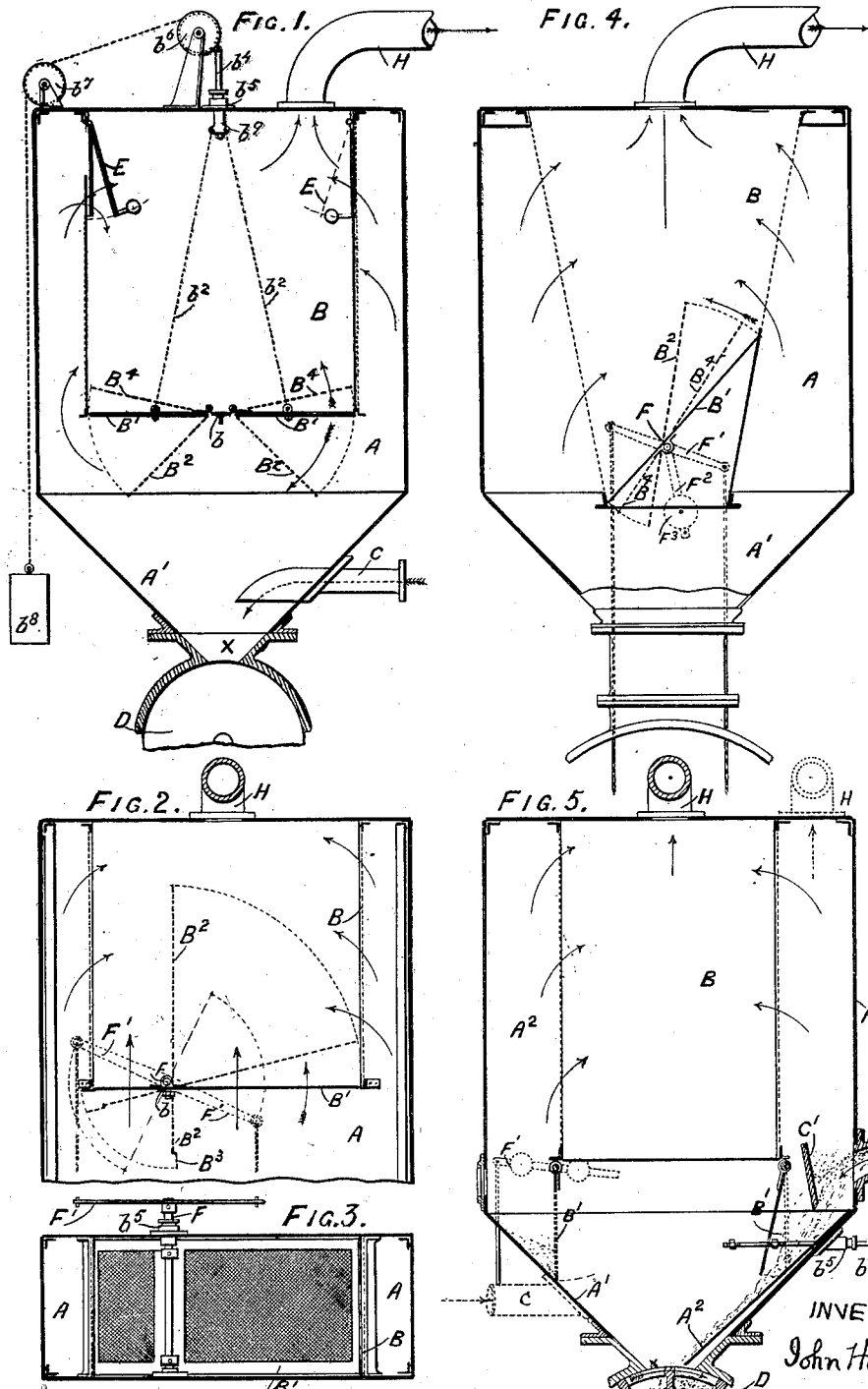

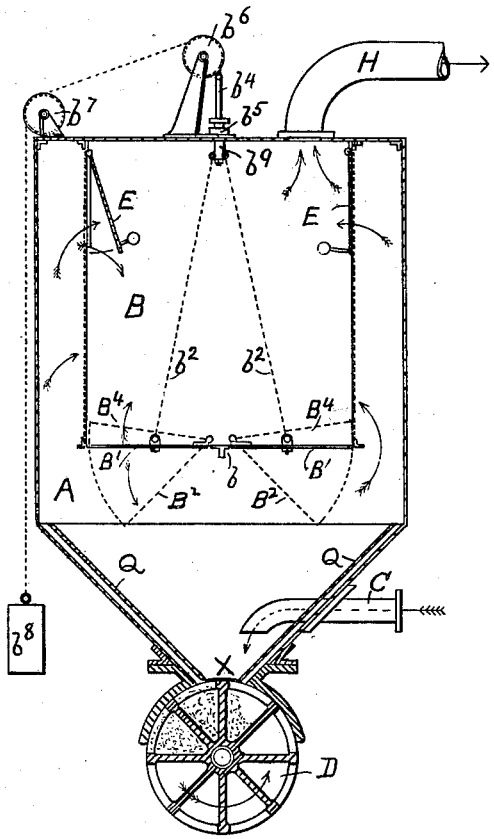

No. 738,798. Patented September 15, 1903.

UNITED STATES PATENT OFFICE.

JOHN HAVILAND, OF NORTHAMPTON, AND FREDERICK H. HAVILAND, OF BOURNEMOUTH, ENGLAND, AND JOHN FARMER, OF GLASGOW, SCOTLAND.

APPLIANCE FOR ELEVATING AND DISCHARGING GRAIN OR THE LIKE.

SPECIFICATION forming part of Letters Patent No. 738,798, dated September 15, 1903.

Application filed July 15, 1902. Serial No. 115,721. (No model.)

*To all whom it may concern:*

Be it known that we, JOHN HAVILAND, solicitor, a resident of Northampton, Northamptonshire, FREDERICK HENRY HAVILAND, solicitor, a resident of Bournemouth, Hampshire, England, and JOHN FARMER, engineer, a resident of the city of Glasgow, Scotland, all subjects of the King of Great Britain and Ireland, have invented a certain new and useful Improved Appliance for Elevating and Discharging Grain or the Like, (for which we have made application for a patent in Great Britain, No. 25,925, dated the 19th of December, 1901,) of which the following is a specification.

This invention has reference to improvements in and connected with the internal fittings of the vacuum-chamber of our pneumatic elevator described in United States Patent No. 650,719, dated May 29, 1900; and it consists of the dust-trapping fittings, the air-partition plates, and an arrangement of internal conducting-pipes for the grain.

With reference to the dust-trapping chamber we find that when our air-lock wheel-valve for discharging the grain from the vacuum-chamber is not used and other devices employed, such as automatic discharging arrangements, a considerable volume of air and grain is ejected intermittently into the vacuum-chamber, which has the effect of causing shocks upon the gauze or other perforated filtering-screens forming the dust-trapping chamber, tending to cause rupture and wear. Automatic grain-discharging apparatus as a rule cannot be made to work so tight-fitting as a mechanically-driven device, also there is generally a continuous flow through leakage of outside air up the grain-discharge orifice in the hopper into the vacuum-chamber. When light oats are being elevated and the vacuum in the vacuum-chamber is high, the inrush of this air added to that which is injected as each air-filled chamber of the automatic device comes under the orifice in the hopper to get filled with grain is often sufficient to prevent light oats from falling by gravity into it, the inrush of air instead forcing back the grain in the vacuum-chamber until it becomes choked. To meet this difficulty, the air-pumping engines at present have to be driven slower to reduce the vacuum, which is a considerable loss of time and which we avoid by our improvements. When the incoming grain is forced back within the vacuum-chamber, as mentioned, the gauze filtering screens or chambers have their filtering-surfaces so reduced that they generally burst or collapse through unequal vacuum inside and outside. We by our application and arrangement of valves overcome this difficulty.

It may be convenient at times to admit the grain to be discharged into the vacuum-chamber at a considerable height up or even on top instead of, as commonly done, near the bottom of the hopper. In order to prevent the grain from being broken by falling such a height, we employ pipes within the chamber so constructed as to relieve the impetus given the grain by allowing for the escape of the grain-conducting air before the grain leaves the pipe.

Grain-discharging mechanism whether of the mechanically driven or automatic arrangement may either be used with our improvements.

In order that others skilled in the art to which our invention relates may understand how the same may be carried into practice, we have hereunto appended explanatory drawings, in which—

Figure 1 is a sectional elevation of the vacuum-chamber into which the grain is elevated, showing the dust-separating chamber with suspended dust-delivery and safety-valve doors for freeing the air from husks and dust before it is withdrawn into the pipes leading to the vacuum-pumps. Figs. 2 and 3 are sectional elevation and plan of a rectangular vacuum-chamber with dust-separating screens fitted with a modified form of dust-discharge and safety-valve door. Fig. 4 is a section of a vacuum-chamber fitted with a dust-separating conical sieve with combined discharging and safety valve. Fig. 5 is a sectional elevation of vacuum-chamber fitted with dust-filtering chamber with suspended doors at bottom for the entrance of grain and dust to hopper. Figs. 6 and 7 are sectional elevations of vacuum-chamber fitted with filtering-chamber having safety-valves near top under portion movable and fitted with "kicking" arrangement for releasing the dust. Fig. 8 is a dust-screen of perforated plating or gauze mounted in a frame and fitted within vacuum-chamber and lifted up and let fall by a "kicker" arrangement. Figs. 9, 10, 11, 12, 13, and 14 are sectional views illustrating modified forms of the dust-trapping arrangements and modes of releasing the dust into the hoppers. Fig. 15 is a sectional view similar to Fig. 1, showing the air-escape plates at the lower end of the chamber.

Referring to the drawings, Fig. 1 shows a vacuum-chamber A terminating in a hopper A' at the bottom, to which is bolted our grain-delivery-wheel valve D, though any other suitable apparatus may be applied for this purpose, or an automatic grain-delivery arrangement may be used, if desired. A grain-inlet pipe C communicates with the vacuum-chamber by being fixed, as is generally done, to its under side on the hopper A'. A gauze or thin steel plate or other metal perforated dust-filtering chamber B is fitted inside of the vacuum-chamber, reaching its top and carried well down and fitted at its under side with two doors B' B', hinged to cross-rail $b$ and suspended by chains or ropes or any loose connections $b^2$ and jointed to the socket $b^9$ on end of the rod $b^4$, passing through a small stuffing-box $b^5$ on top of the chamber. A chain or rope attached to end of rod $b^4$ is passed over pulleys $b^6$ and $b^7$, terminating in a counterweight $b^8$, which more than balances the doors, that are prevented being drawn up past the level position through the socket $b^9$, which acts as a stop. A pipe H is connected to top of vacuum-chamber A in connection with air-pumps, which upon being started cause a vacuum of, say, from five to seven pounds per square inch within the vacuum-chamber, which draws in air with the grain through the pipe C. The grain-conveying piping that is bolted to this pipe C is not shown in these drawings. The grain by gravity falls into the pockets of the revolving wheel-valve D and is conveyed down a delivery-chute or otherwise to the receiving-vessel. The dust-laden air ascending passes through the fine holes in the gauze chamber B and through the pipe H on its way to the vacuum or air pumps, leaving within the vacuum-chamber the husks and coarser dust and material contained in the grain, which fall down and are carried away and delivered with it through the grain-discharging apparatus. The air that passes through the gauze contains much of the finer dust, a considerable quantity of which settles down upon the doors B'. This has to be let away at intervals, preferably when there is a stoppage of engines or in the process of elevating. If this is not done, the accumulation of this dust decreases the area of the filtering-gauze, causing it to be burst in by the vacuum. To prevent such an occurrence, we fit in simple doors or valves E, hinging them in a loose manner as near the top of the chamber as possible. To let away the fine dust when desired, the weight $b^8$ is pushed up till the doors B' fall down to the position shown by dotted lines $B^2$. When an automatic grain-discharging apparatus is used, the periodical inrushes of air will lift up the doors B', as indicated by the dotted lines at $B^4$, for an instant, and so relieve the pressure that would otherwise fall upon the gauze. The valves E will also assist in relieving any sudden pressure.

We have fitted in doors to the under side of our filtering-chamber to open and let out the fine dust, as described in our patent referred to, but the vacuum-chamber had to be entered for this purpose, and we also fitted a valve on the door opening inward as a safety-valve for the relief of the gauze-chamber; but we find a very great advantage from having the whole of the bottom of the vacuum-chamber to act, both for the letting away of the dust and for a safety-valve as well, thereby obtaining great area, and by being operated upon from the outside at any time it can always be kept in order and there never is doubt regarding the certainty of its action. More than two doors may be fitted, if desired, which should run radially if in a circular chamber.

Figs. 2 and 3 are sectional elevation and plan of part of a rectangular vacuum-chamber A with dust-separating screens B and having a dust-discharging door B', which also acts as a safety-valve should any sudden pressure come upon its under side owing to the spindle F, upon which it works, being placed to the one side. The spindle is passed through a stuffing-box $b^5$ on side of vacuum-chamber and actuated by lever F'. Upon the door B' being let smartly down, the stop $B^3$, coming against the bottom of screen B, shakes the dust from its sides.

Fig. 4 is a sectional elevation of a vacuum-chamber A having fitted within it a conical dust-filtering chamber B, having at its under part the swivel-valve B', mounted on the spindle F, placed out of center, so that the valve will be out of equilibrium and open up, say, to the position as shown by dotted line $B^4$ upon any sudden rise of pressure—say from a sudden inrush of air from any source or by the gage-chamber getting clogged up from any cause. To discharge the fine dust that gathers in the chamber, the lever F' is drawn by rope or other attachment which brings the valve to or nearly the perpendicular position $B^2$, when all dust readily falls out. The lever with counterweight $F^2$ brings back valve to the closed position readily. The conical shape of chamber allows of the valve B', which acts as dust-discharging and safety valve as well, being of smaller size than those previously shown and described.

Fig. 5 is a sectional elevation of a vacuum-chamber A in which the gauze or perforated thin metal plating forming the filtering-chamber B reaches with its under doors or valves from top to bottom, resting on the hopper A'. The grain enters at the pipe C, and a protecting-baffle C' is fitted upon which it impinges, falling down on top of protecting-plate $A^{20}$ and passing on to the grain-discharging apparatus, which is here shown as a wheel-valve D. Valves or doors B' are fitted all around or at intervals, one of them, B', or more, if necessary, being to admit the grain to the hopper, the others to admit the fine-trapped dust in the compartment $A^2$ down to the discharging-valve D. The valve B', where the grain enters, is pushed out or in by the rod $b^4$, passing through small stuffing-box $b^5$ in the hopper, and the valves B' at the other side for letting out the dust may be operated upon in similar manner if the outside pressures of grain, dust, and air do not open them sufficiently, or if these were fitted in a rectangular vacuum-chamber they could be operated by levers F' and be made preferably the full length of the compartment $A^2$. The grain may be taken inside of filtering-chamber B by pipe C and the air drawn away outside through pipe H, if desired, as shown by dotted lines.

Fig. 6 is a sectional elevation of a vacuum-chamber A in which the gauze or other dust-filter B reaches from top to bottom. The lower part $B^5$ is of smaller diameter than that above and is made to telescope up easily within it for the purpose, whenever desired, of letting away the fine dust in the space $A^2$, which is annular in this case, to the discharge-valve D. The lower part of filter $B^5$ is suspended by links or chains $b^2$ and connected to lever F', fulcrumed at $F^2$ and connected at other end by rod $F^3$, which is jointed to a usual kicker arrangement I, worked by cam J and mechanically driven from where most convenient, but in this case would be, preferably, from the wheel-valve-driving gear. The kicking motion imparted to this part $B^5$ allows of the fine dust being knocked off the gauze and keeping it clear. To allow of the part $B^5$ being lifted up considerably above the height of that obtained from the kicker motion to let out any large accumulation of dust, a chain and handle $F^4$ are attached in connection with $F^3$ to allow for this. In order to produce a shock to the top part of gauze filter B to knock off the dust as well as to the under part $B^5$, a number of pins $b^{10}$, Fig. 7, may be inserted in a flange $b^{11}$, surrounding the top part of $B^5$, which would strike in falling against projections $b^{12}$, fastened to the under side of filtering-chamber B. A strip of thin india-rubber laid on flange $b^{11}$ and projecting to the inside of B would keep sufficient tightness between them. The filtering-chamber $B^5$ may be prolonged, as shown by dotted lines Y Y, Fig. 6, having a cover on top and attached to rod $b^4$, thus dispensing with the outer chamber B.

Fig. 8 is a sectional elevation of part of a rectangular vacuum-chamber A having a filtering-screen B, mounted in framing $B^6$ and free to be lifted and let fall by a kicker movement, as already described with reference to Fig. 6. The framing would work in side guides K, a screen $B^6$ would be placed in front to cover the space between the top of screen B and the top of vacuum-chamber, or the space would be covered by loose india-rubber or canvas jointed to vacuum-tank and screen. A usual baffling-cowl $C^2$ would be placed over the mouth of pipe C to prevent the fine dust running down the hopper A' from being blown about.

Fig. 9 is a sectional elevation of part of a vacuum-chamber A in which the filtering-screen B reaches from top to within a foot or two of the bottom, this space being filled by the door B', which acts the part of letting off the fine dust and answering as a safety-valve as well by being free to move in either direction beyond the screen B. The door B' is actuated by lever and counterweight, as described with reference to Figs. 1, 2, 3, and 4.

Fig. 10 is a sectional elevation of part of a rectangular vacuum-chamber in which the door or valve B' is fulcrumed off the center, which allows of it opening and acting as a safety-valve to the gauze screen B and also for letting away the fine dust, as described with reference to the door or valve shown upon Fig. 2, but which lies horizontally instead of upright as in this figure.

Fig. 11 is an arrangement showing a door or valve B' free to move in either direction and to open automatically and let the fine dust escape should its weight be sufficient to overcome the friction of moving the door. If not, the fine dust can be let away by operating from the outside by lever F'. To allow this door to act the part of a safety-valve at times as well, in order to allow it to travel inward into the fine-dust chamber $A^2$, we fulcrum another door L to its under side connected by an outside lever F', so that it may be turned downward in order to allow all the dust in the chamber $A^2$ to be cleared away.

Fig. 12 is an arrangement whereby the valve B', balanced by lever and weight F', is so placed that the weight of the fine dust may open it and escape if sufficient has been allowed to gather in the fine-dust chamber $A^2$. It is also arranged to be worked from outside.

Fig. 13 is a modification of Fig. 12, being suitable more particularly for rectangular vacuum-chambers, in which the valves may open automatically to relieve the dust and at the same time may act as safety-valves by moving upward within the chambers $A^2$ $A^2$ before they are covered with too much dust. In the case of any of these valves failing to act automatically in relieving internal pressures upon the gauze the valve E, fitted as explained with reference to Fig. 1, will prevent damage to the filters.

Fig. 14 is a sectional elevation of a vacuum-chamber, showing the filtering-screens B carried to the top of vacuum-chamber and there hinged, so as to open and act as safety-valves when necessary. Stops $b^9$ are inserted for their coming against, and valves B' are fitted to close the dust-chambers $A^2$, as already described. These can all be operated when necessary from the outside by the levers shown.

In Fig. 15, inside the lower end of the chamber, plates Q are provided to substantially surround the discharge-opening X and furnish channels surrounding the grain-delivery device D. The air can draw through these channels, and thereby allow the grain to fall properly between the plates Q into the delivery device D uninfluenced by the inbrushing of the atmosphere.

Having now described our invention, what we claim, and desire to secure by Letters Patent, is—

1. A vacuum-chamber for pneumatic grain-elevating apparatus, comprising a discharge-opening with an air-lock grain-delivery device fitted thereat, a feed-opening and an air-opening, means within the chamber for separating the air from the grain-dust, and means without the chamber for causing said separated dust to fall within the chamber to be carried off with the discharged grain.

2. A vacuum-chamber for pneumatic grain-elevating apparatus, comprising a discharge-opening with an air-lock grain-delivery device fitted thereat, a feed-opening and an air-opening, screens within the chamber to separate the air from the grain-dust, and means without the chamber for removing the collected dust from said screens from time to time.

3. A vacuum-chamber for pneumatic grain-elevating apparatus, comprising a discharge-opening with an air-lock grain-delivery device fitted thereat, a feed-opening and an air-opening, screens within the chamber, means without the chamber adapted to remove collected dust from the screens from time to time, in combination with safety-doors in the screens adapted to be opened by pressure, substantially as described.

4. A vacuum-chamber for pneumatic grain-elevating apparatus, comprising a discharge-opening with an air-lock grain-delivery device fitted thereat, a feed-opening and an air-opening, hinged screens in the chamber, said screens adapted to be moved inwardly by means outside the chamber as described.

5. A vacuum-chamber for pneumatic grain-elevating apparatus, comprising a discharge-opening with an air-lock grain-delivery device fitted thereat, a feed-opening and an air-opening, screens within the chamber and "kicker" means outside the chamber, for removing the collected dust on said screens, substantially as described.

6. A vacuum-chamber for pneumatic grain-elevating apparatus, comprising a discharge-opening with an air-lock grain-delivery device fitted thereat, a feed-opening and an air-opening, a screen surrounding the air-opening, doors to said screen and means for raising and lowering said doors from without the chamber, as and for the purpose described.

7. A vacuum-chamber for pneumatic grain-elevating apparatus, comprising a discharge-opening with an air-lock grain-delivery device fitted thereat and an inlet-opening at the lower part of said chamber, and air-opening in the upper part of said chamber and a screen separating them, doors in said screen and means outside of the chamber adapted to operate the doors from time to time, substantially as described.

8. A vacuum-chamber for a pneumatic grain-elevating apparatus, comprising a discharge-opening with an air-lock grain-delivery device fitted thereat, an inlet-opening and an air-opening, air-channels substantially surrounding the discharge-opening and leading therefrom upwardly within the chamber to a point above the inlet for the grain, substantially as described.

In testimony whereof we have signed our names to this specification in the presence of two subscribing witnesses.

JOHN HAVILAND.
F. H. HAVILAND.
J. FARMER.

Witnesses:
WM. RUTHERFORD,
THOMAS BENNIE BROWNLIE.